Patented Nov. 23, 1926.

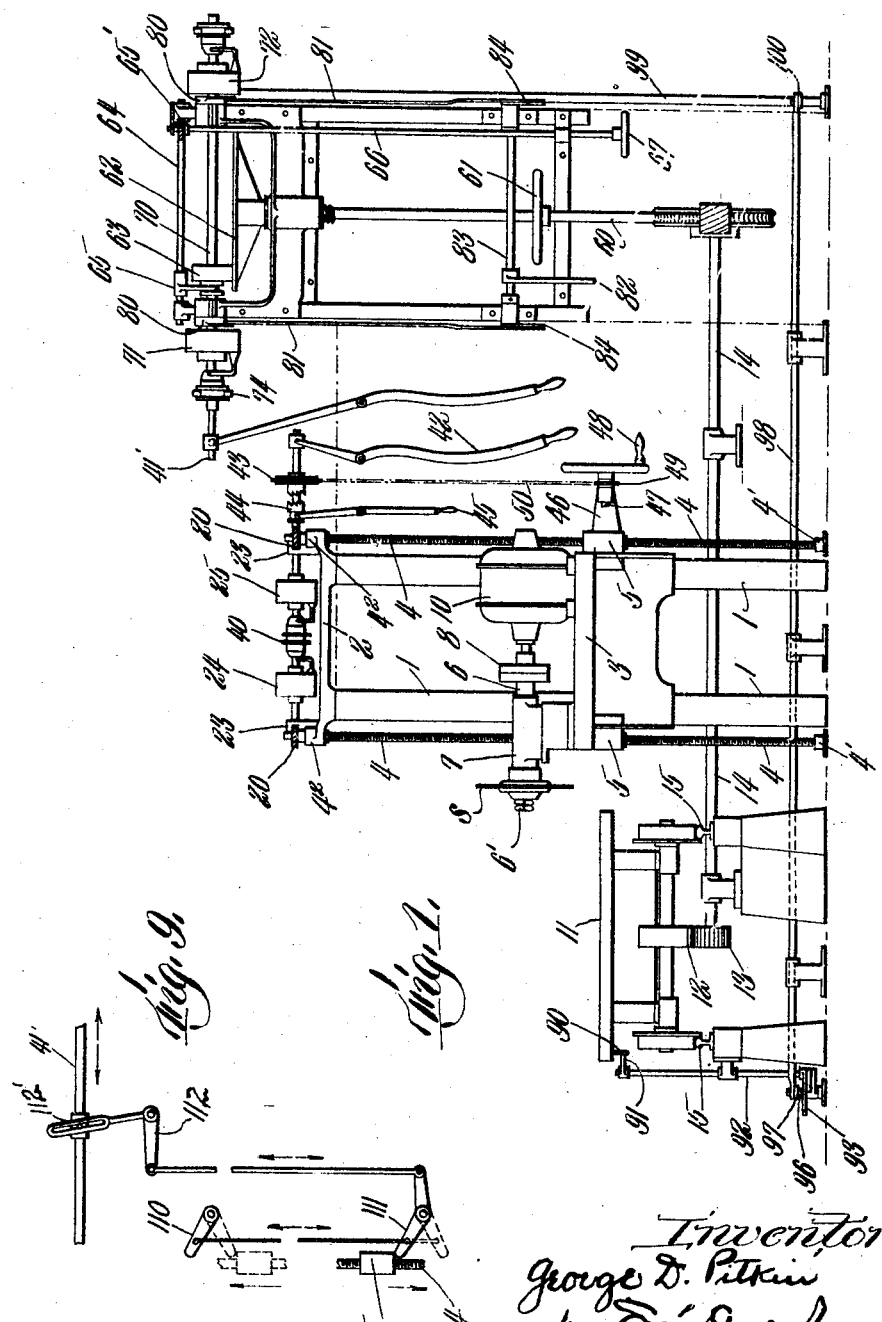

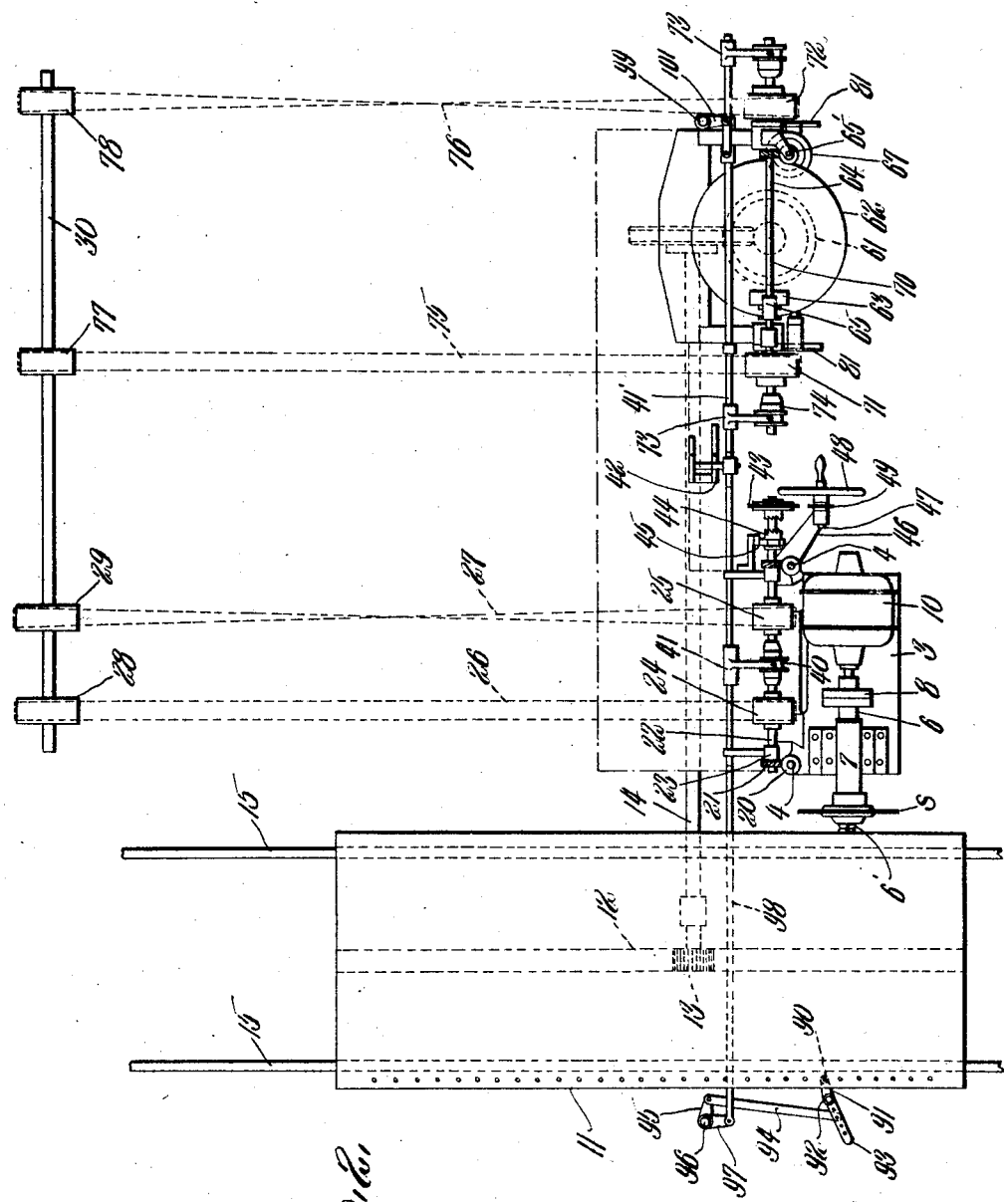

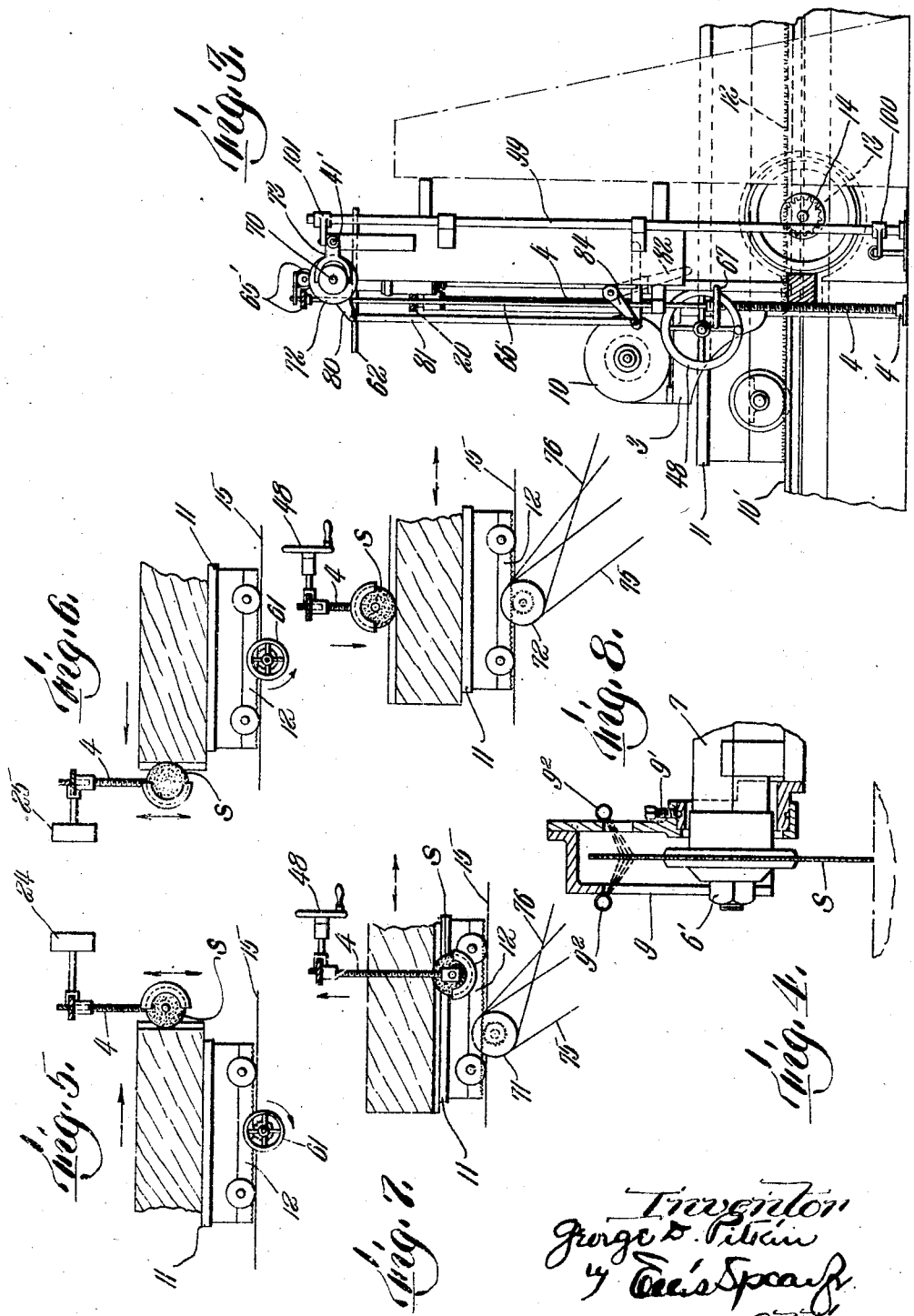

1,607,641

UNITED STATES PATENT OFFICE.

GEORGE D. PITKIN, OF MONTPELIER, VERMONT, ASSIGNOR TO LANE MANUFACTURING COMPANY, OF MONTPELIER, VERMONT, A CORPORATION.

ABRASIVE SAW-EDGING MACHINE OR THE LIKE.

Application filed August 18, 1923. Serial No. 658,091.

This invention relates to stone abraiding machines and particularly to the edging, trimming or finishing of a block or slab of stone by means of an abrasive disc or cutter. While my invention in its preferred embodiment is capable of a variety of uses it may be conveniently considered in connection with its applicability to certain work which has heretofore not been successfully or conveniently accomplished by existing machines. Without therefore limiting myself to its use or to the exact form shown, I will discuss my invention in connection with an embodiment which well illustrates the principles involved and which also is in itself a highly successful, practical and convenient machine.

Also taking as an illustrative example an operation frequently desired and heretofore involving considerable difficulty and expense, I will discuss the illustrative embodiment herein set forth with particular reference to the saw edging of stone because that operation is not only characteristic but well illustrates the convenience and versatility of devices in accordance with my invention.

In the operation of saw edging it is usually desired to cut a block of stone so as to form the necessary edges which define the shape or form of the ultimate block. These edges are usually at right angles and are usually defined by flat narrow surfaces on each side of the actual edge, leaving the faces of the stone between such defining edges for subsequent treatment in accordance with the ultimate purpose or design of the block.

It will be seen that in working any block that there may be a multiplicity of such edges bounding the different faces but for the purpose of the present invention the simple rectangular block may be considered. Even in such a block it will be seen that there are six faces that have to be considered, involving twelve edges and twenty-four edge surfaces. Each one of these edge surfaces represents in reality one face of a saw kerf and the great difficulty has been to produce these defining surfaces cheaply and expeditiously without undue elaboration of apparatus or without the frequent resetting of the stone which by reason of its weight is usually cumbersome and difficult to handle and position accurately. Various devices have been suggested and some produced but these usually have been complicated and expensive and difficult to operate accurately especially where more than one abrasive cutter has been used by reason of the fact that the wear of the cutters are seldom uniform and uniformity of result throughout is an important factor. Without going further into the various problems involved I will briefly point out that in accordance with by invention I am able with a single cutter and without any shifting of the stone to make four independent cuts in the same plane and with the same feeds or drives. This I accomplish in brief by providing certain relative movements and by making the drives therefor substitutably drives or feeds in the different phases of operation. It will be borne in mind that with such devices as abrasive cutters, the matter of feed is necessarily slow and must usually be accomplished by hand with care and judgment while the traversing movements are rapid and under power.

Coming now to the embodiment selected for the purposes of the present invention I have shown in the accompanying drawings a device, various parts of which are indicated by reference characters employed in the following specification as a means of identifying various parts. In the drawings:

Fig. 1 is a front elevation of the machine.
Fig. 2 a plan elevation of the same.
Fig. 3 a side elevation.
Fig. 4 an enlarged sectional detail of the saw and guard working on a horizontal cut, and
Figs. 5, 6, 7 and 8 are diagrammatic illustrations of the relative positions of saw and work and the traversing feed and hand control of the relative movements in the four different cutting positions.
Fig. 9 is a detail of the vertical traversing reverse.

In the embodiment shown I provide a suitable frame comprising a pair of vertical uprights 1 preferably connected at their upper ends by a cross frame or head 2 upon which is carried various driving and control mechanisms which will be described hereafter.

Slidably mounted on the column 1 and suitably gibbed to one side thereof is a bed or table 3 having suitable bearing on the columns so as to be guided and steadied thereby. The bed 3 is actually supported and vertically fed by threaded shafts 4 working in traversing nuts 5 suitably carried by the bed 3 whereby the bed may be raised or lowered either for vertical travel or for vertical adjustment of the saw.

The saw arbor 6 is mounted in a bearing 7 and carries an abrasive saw or cutter 8 which may be of any desired or convenient type being held thereon by the lock nuts $6^1$. The saw in the form shown is directly driven by the motor 10 mounted on the bed 3 and connected by any suitable coupling, as for example, the arbor coupling 8. The saw is supported in projected relation to the frame so that it extends adjacent a trackway 15. Truck cars 11 are provided upon which stones to be worked are properly set and trued up to desired position relative to the saw. Mounted on the bearing of the saw arbor 6 and adjustable about the same so that it may be properly positioned for the different cutting positions of the saw is a guard 9 clamped by set screws $9^1$ and having water nozzles $9^2$ for directing streams of water against the blade of the saw while at its work. (See Fig. 8.)

Each car 11 is provided with an underlying rack 12 which is engaged by a pinion 13 on a shaft 14 disposed beneath the track whereby the car may be reciprocated relative to the saw in its traversing movement or may be adjusted to the saw in its feeding movement.

The feed adjustments and controls are provided for in relation to the two functions heretofore mentioned in both the saw and the stone carrier or truck 11. The feeds and controls are in substitutable relation so as to give automatic movement for the relative traversing movements for lineal cut and also to provide for the manual feed of the saw to the stone in its different working positions.

The control of the bed 3 and the saw arbor 6 carried thereby is effected by the drives of the vertical threaded shafts 4. These are rotatably mounted in lower bearings $4^1$ and upper bearings $4^2$. Each is provided at its upper end with a spiral gear 20 meshing with another spiral gear 21 on a cross shaft 22 supported in suitable bearings 23. The shaft 22 carries a pair of pulleys 24 and 25 adapted to receive belts 26 and 27 from the pulleys 28 and 29 on the cross shaft 30. These pulleys are clutch pulleys being controlled by intermediate clutch member 40 and operated by a shifter 41 controlled by a lever 42 whereby the vertical threaded shafts 4 may be driven in either direction or left at rest.

On the shaft 22 is also a sprocket 43. This sprocket is loosely mounted but provided with an interengaging clutch 44 controlled by a lever 45. Bracketed on one of the columns 1 outside of the gib bearing of the bed 3 is a bearing 46 carrying the shaft 47 controlled by a hand wheel 48 which turns the sprockets 49. A chain 50 connects the sprockets 49 and 43 so that upon the engagement of the clutch 44 and with the pulley clutch 40 in idling position the cross shaft 22 will be guided by the hand wheel 48 to give the vertical feeding motion to the abrasive saw in lieu of its other traversing motion produced by the power drive through the pulleys 24 and 25.

The control and feed of the car 11 is effected through a vertical shaft 60 having a hand wheel 61 by which it may be rotated when its feeding movement is to be effected. The shaft is driven by a disc 62 frictionally engaged by a friction wheel 63 on the shaft 70. The friction wheel 63 is adjustable radially relative to the friction disc 62 by means of a control 64 which moves the forked carrier 65. The shaft 64 is spirally geared as at $65^1$ to a vertical control shaft 66 having a hand wheel 67 conveniently disposed to the operator.

Power is supplied to the shaft 70 on which the friction wheel 63 is mounted by pulleys 71 and 72 driven by belts 75 and 76 and pulleys 77 and 78 on the shaft 30. These pulleys are loose pulleys controlled by clutches 74 and engageable and disengageable by controls 73 mounted on the clutch shift rod $41^1$.

The shaft 70 which carries the friction wheel 63 is mounted on a pair of eccentric bearings 80 which have a lifting action on the shaft 70 so that the friction wheel 63 can be raised to clear the disc 62 or be brought in driving contact therewith. The eccentric bearings 80 are rocked by connecting links 81 controlled by a lever 82 and a cross shaft 83 carries at each end a short arm 84 on which the lower ends of the links 81 are connected.

The reciprocation table 11 in its traversing motion is automatically reversed and controlled by a trip 90 engaging an arm 91 disposed in its path. The arm 91 is mounted on a vertical rock shaft 92 which at its lower end has a lever 93 which is connected across by a link 94 to a lever 95 on the shaft 96. The short rock shaft 96 carries an arm 97 which has connected thereto a rod 98 passing under the entire apparatus, and connected to the shaft 99 through the lever 100. At the top of shaft 99 is another lever 101 that connects with the clutch rod $41^1$ whereby the pulleys 71 and 72 may be alternately connected and disconnected with the drive. By this means in the ordinary traversing movements of the car it is reversed at each end of its desired traverse so as to bring the stone again past the saw S.

It will thus be seen that through these drives and controls it is possible to produce saw cuts entirely around a block or slab of stone without changing the set of the stone and by merely converting power driven traversing into hand feeding by shifting from power feed to hand control and vice versa. In making the longitudinal cut across the top of the stone the saw guard is positioned above the saw, the car is automatically traversed by the power drive and the saw is fed by the hand control of the vertical traversing screw, their power connection being thrown out. In making the vertical cut at either end of the stone the car is withdrawn from beneath the saw, its guard swung laterally and the saw vertically traversed by its power drive which is now clutched in with the hand control thrown out, it being reversed by the tripping of the lever 110 which alternately operates the bell cranks 111 to shift the clutch rod 41¹. In these two end positions (see Figs. 5 and 6) the feed of the saw is produced by the manual manipulation of the wheel 61 of the car drive so that the stone is advanced to the saw instead of the saw to the stone. In making the undercut the guard is swung to a position diametrically from that first mentioned so that it lies underneath the saw (see Fig. 7). The saw carriage is lowered to position to below the level of the lower face of the stone, the power traverse is again thrown in for moving the car back and forth and the feed of the saw accomplished by the hand control 48 gradually raising the saw carriage to lift the saw against the stone. I have attempted to show these several positions and feeds and traverses diagrammatically in Figs. 5 to 8 inclusive.

The automatic vertical traverse of the saw carriage is effected by the movement of the belt shifter rod 41 by the control shown in Fig. 9. This control which is shown separately for the sake of clarity in the drawings is mounted adjacent the path of the threaded nuts 5 on the feed screws 4. It comprises a pair of levers 110 and 111 suitably positioned and spaced on the frame and linked together. The lower lever 111 is a bent lever linked to another bent lever 112 carried at the head of the machine adjacent the shifter rod 41¹ and connected to it by a slotted connection as at 112¹ whereby the rod will be automatically moved at the end of each vertical cutting traverse of the saw.

In this way I am able to perform such operations as saw edging or in forming edge mouldings. The various ordinary sawing, surfacing or other operations involving less complicated problems may also be done on this same machine. These can be done with a minimum of moving and setting of the stone. All such various usages are contemplated and all those modifications of structure and operation are to be considered as comprehended as within my invention if within the limits of the appended claims.

What I therefore claim and desire to secure by Letters Patent is:

1. In a stone abraiding machine of the class described, a horizontally reciprocable stone carrier, a rotatable arbor for an abrasive saw disposed adjacent the path of said carrier, power means for automatically reciprocating said carrier past said saw arbor for producing a traversing cut, hand means for moving said carrier to feed the saw to the stone for a vertical cut, power driven means for vertically reciprocating the saw arbor for producing a vertical traverse of the saw for its vertical cut, and substitutable hand means for feeding the saw vertically to the stone for its horizontal cut.

2. In a stone abraiding machine of the class described, a horizontally reciprocable stone carrier, a supporting frame, a table vertically slidable thereon, a rotatable arbor for an abrasive saw extended adjacent the path of said carrier, a rack and pinion drive for automatically reciprocating said carrier past said saw arbor for producing a traversing cut, a power connection therefor, a hand connection for moving said carrier to feed the saw to the stone for a vertical cut, feed screws for vertically reciprocating the saw arbor for producing a vertical traverse of the saw for its vertical cut, a power connection therefor, and hand means for feeding the saw vertically to the stone for the horizontal cut.

3. In a stone edging machine, a vertical support, a carriage traversable thereon, an overhung saw mounted on said carriage, a way adjacent said support but spaced apart therefrom, a stone support traversably mounted on said way, means for relatively traversing said saw carriage and said stone support along two sets of parallel lines at right angles to each other in the plane of the saw to successively cut the defining edges of the face of a block.

4. In a stone edging machine, a support, a saw carriage traversable thereon, an offset saw mounted on said carriage, a way adjacent said support but spaced apart therefrom, a stone support traversably mounted on said way, means for relatively traversing said saw carriage and said stone support along a path of parallel lines at right angles to each other in the plane of the saw to successively cut the defining edges of the predetermined face of a block.

5. In a stone edging machine, a horizontally reciprocable stone support, a vertically reciprocable saw carriage, a rotatable saw arbor mounted on said saw carriage, power driven means for automatically reciprocating said stone support past said saw arbor for producing a traversing cut, hand means for moving said arbor to feed the saw to the stone for a vertical cut, power driven means for vertically reciprocating the saw arbor for producing a vertical traverse of the saw for its vertical cut, and hand means for feeding the saw vertically to the stone for producing the horizontal cut.

In testimony whereof I affix my signature.

GEORGE D. PITKIN.